United States Patent
Kim

(10) Patent No.: US 10,367,185 B2
(45) Date of Patent: Jul. 30, 2019

(54) RECHARGEABLE BATTERY

(71) Applicants: SAMSUNG SDI CO., LTD., Yongin-si, Gyeonggi-do (KR); ROBERT BOSCH GMBH, Stuttgart (DE)

(72) Inventor: Dukjung Kim, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 782 days.

(21) Appl. No.: 13/872,197

(22) Filed: Apr. 29, 2013

(65) Prior Publication Data
US 2014/0193703 A1    Jul. 10, 2014

(30) Foreign Application Priority Data

Jan. 8, 2013   (KR) .................. 10-2013-0002211

(51) Int. Cl.
*H01M 2/30* (2006.01)
*H01M 2/06* (2006.01)

(52) U.S. Cl.
CPC .............. *H01M 2/30* (2013.01); *H01M 2/06* (2013.01); *H01M 2/305* (2013.01)

(58) Field of Classification Search
CPC .... H01M 2/06; H01M 2/1229; H01M 2/1223; H01M 2/1241; H01M 2/345
See application file for complete search history.

(56) References Cited

U.S. PATENT DOCUMENTS 5,741,606 A * 4/1998 Mayer ................ H01M 2/1229
                                                              429/53
6,117,586 A * 9/2000 Kim .................... H01M 2/0404
                                                           429/175
(Continued)

FOREIGN PATENT DOCUMENTS

JP         05-038765 A     2/1993
JP         05-325930 A    12/1993
(Continued)

OTHER PUBLICATIONS

Korean Notice of Allowance dated Sep. 23, 2016 in Corresponding Korean Patent Application No. 10-2013-0002211.

*Primary Examiner* — Ula C Ruddock
*Assistant Examiner* — Thomas H. Parsons
(74) *Attorney, Agent, or Firm* — Lee & Morse, P.C.

(57) ABSTRACT

A rechargeable battery including an electrode assembly, the electrode assembly including a first electrode plate, a second electrode plate, and a separator; a first terminal electrically connected to the first electrode plate; a second terminal electrically connected to the second electrode plate; a case accommodating the electrode assembly and portions of the first terminal and second terminal; a cap assembly sealing the case, the cap assembly being electrically connected to the first terminal; and dish-shaped first and second connection plates on the first terminal and the second terminal, respectively, the first and second connection plates being configured to invert in response to a predetermined pressure respectively applied to the first terminal and the second terminal.

14 Claims, 6 Drawing Sheets

(56) References Cited

U.S. PATENT DOCUMENTS

| | | | |
|---|---|---|---|
| 2010/0233529 A1* | 9/2010 | Nansaka | H01M 2/021 429/181 |
| 2012/0214031 A1 | 8/2012 | Kim | |
| 2012/0251851 A1 | 10/2012 | Kim et al. | |
| 2013/0196191 A1* | 8/2013 | Arai et al. | 429/61 |

FOREIGN PATENT DOCUMENTS

| | | |
|---|---|---|
| JP | 09-017416 A | 1/1997 |
| JP | 09-129214 A | 5/1997 |
| JP | 10-270010 A | 10/1998 |
| KR | 10-2012-0094994 A | 8/2012 |
| KR | 10-2012-0110825 A | 10/2012 |

* cited by examiner

RECHARGEABLE BATTERY

CROSS-REFERENCE TO RELATED APPLICATION

Korean Patent Application No. 10-2013-0002211 filed on Jan. 8, 2013, in the Korean Intellectual Property Office, and entitled: "RECHARGEABLE BATTERY," is incorporated by reference herein in its entirety.

BACKGROUND

1. Field

Embodiments relate to a rechargeable battery.

2. Description of the Related Art

Unlike primary batteries, which are not chargeable, secondary batteries are chargeable and thus referred to as rechargeable batteries. Small capacity batteries (each having a single unit cell) may be used for various portable electronic devices such as mobile phones, or camcorders. Large capacity batteries (each having a plurality of unit cells) may be used as the power source for driving motors, such as those in hybrid electric vehicles.

SUMMARY

Embodiments are directed to a rechargeable battery.

The embodiments may be realized by providing a rechargeable battery including an electrode assembly, the electrode assembly including a first electrode plate, a second electrode plate, and a separator; a first terminal electrically connected to the first electrode plate; a second terminal electrically connected to the second electrode plate; a case accommodating the electrode assembly and portions of the first terminal and second terminal; a cap assembly sealing the case, the cap assembly being electrically connected to the first terminal; and dish-shaped first and second connection plates on the first terminal and the second terminal, respectively, the first and second connection plates being configured to invert in response to a predetermined pressure respectively applied to the first terminal and the second terminal.

The first terminal may further include a first collector plate electrically connected to the first electrode plate and having a second region adjacent to the cap assembly, and a first electrode terminal on the cap assembly and electrically connected to the cap assembly, wherein the first connection plate is interposed between a portion of the cap assembly and the second region of the first collector plate and electrically connects the cap assembly to the first collector plate.

The first connection plate may have a downwardly convex dish shape in which a central bulge thereof is electrically connected to the first collector plate and an edge portion thereof is electrically connected to the cap assembly.

The first terminal may further include a first elastic supporting member between a top portion of the central bulge of the first connection plate and the first electrode terminal.

The first elastic supporting member may be made of silicon.

An edge portion of the first connection plate may be welded to the cap assembly.

A portion of the cap assembly welded to the edge portion may be an outer peripheral edge of a first electrode hole in the cap assembly.

The first electrode terminal may include a first terminal hole passing therethrough from a top surface to a bottom surface of the first electrode terminal such that the first electrode terminal has a ring-shaped horizontal section.

The second terminal may further include a second collector plate electrically connected to the second electrode plate and having a collector plate protrusion adjacent to a top portion of the cap assembly, and a second electrode terminal on the cap assembly and electrically insulated from the cap assembly, wherein the second connection plate is on the cap assembly and electrically connects the second collector plate to the second electrode terminal.

The second connection plate may have a downwardly convex dish shape in which a central bulge thereof is electrically connected to the second collector plate and an edge portion thereof is electrically connected to the second electrode terminal.

The edge portion of the second connection plate may be welded to the second electrode terminal.

The second terminal may further include a second elastic supporting member between a top portion of the central bulge of the second connection plate and the second electrode terminal.

The second elastic supporting member may be made of silicon.

The second electrode terminal may further include a second terminal protrusion horizontally protruding to a top portion of the second terminal hole.

The second electrode terminal may include a second terminal hole passing therethrough from a top surface to a bottom surface of the second electrode terminal such that the second electrode terminal has a ring-shaped horizontal section.

The first terminal may further include a first collector plate electrically connected to the first electrode plate and having a collector plate protrusion adjacent to a top portion of the cap assembly, and a first electrode terminal on the cap assembly and electrically connected to the cap assembly, wherein the first connection plate has a downwardly convex dish shape in which a central bulge thereof is electrically connected to the collector plate protrusion and an edge portion thereof is electrically connected to the cap assembly and the first electrode terminal.

The edge portion of the first connection plate may be interposed and welded between the cap assembly and the first electrode terminal.

A portion of the cap assembly welded to the edge portion may be an outer peripheral edge of a first electrode hole formed in the cap assembly.

The central bulge of the first connection plate may pass through the first electrode hole of the cap assembly and may be electrically connected to the first collector plate.

The first terminal may further include a first collector plate electrically connected to the first electrode plate and having a collector plate protrusion adjacent to a top portion of the cap assembly, and a first electrode terminal on the cap assembly and electrically connected to the cap assembly, wherein the first connection plate is on the cap assembly and electrically connects the first electrode terminal to the collector plate protrusion.

The first electrode terminal may include a first terminal hole passing therethrough from a top surface to a bottom surface of the first electrode terminal such that the first electrode terminal has a ring-shaped horizontal section.

The first connection plate may have a downwardly convex dish shape in which a central bulge thereof is electrically connected to the first collector plate and an edge portion thereof is electrically connected to the first electrode terminal.

The first electrode terminal may further include a first terminal protrusion horizontally protruding to a top portion of the first terminal hole.

The cap assembly may include a first electrode hole passing therethrough from a top surface to a bottom surface of the cap assembly, and the first collector plate is electrically connected to the first connection plate while passing through the first electrode hole.

The first connection plate and the second connection plate may be made of at least one of copper, iron, aluminum, nickel, and combinations thereof.

BRIEF DESCRIPTION OF THE DRAWINGS

Features will become apparent to those of skill in the art by describing in detail exemplary embodiments with reference to the attached drawings in which.

DETAILED DESCRIPTION

Figure 1A:
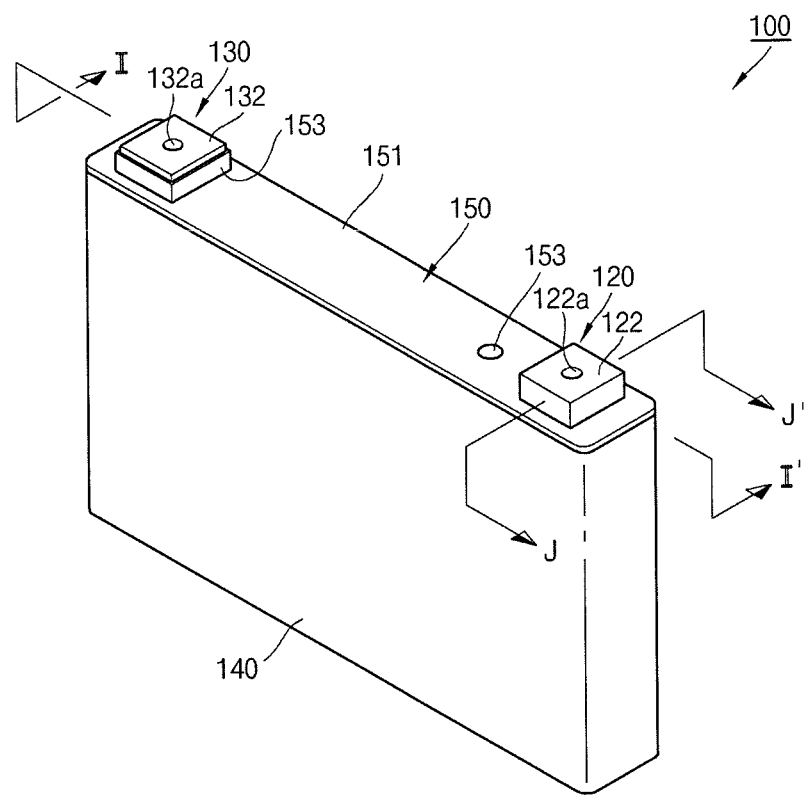
FIG. 1A illustrates a perspective view of a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when a layer is referred to as being "between" two elements, it can be the only element between the two elements, or one or more intervening elements may also be present. Like reference numerals refer to like elements throughout.

In addition, it will be understood that when a layer or element is referred to as being "electrically connected to" another layer or element, it can be directly electrically connected the other layer or element, or intervening elements may also be present.

Figure 1B:
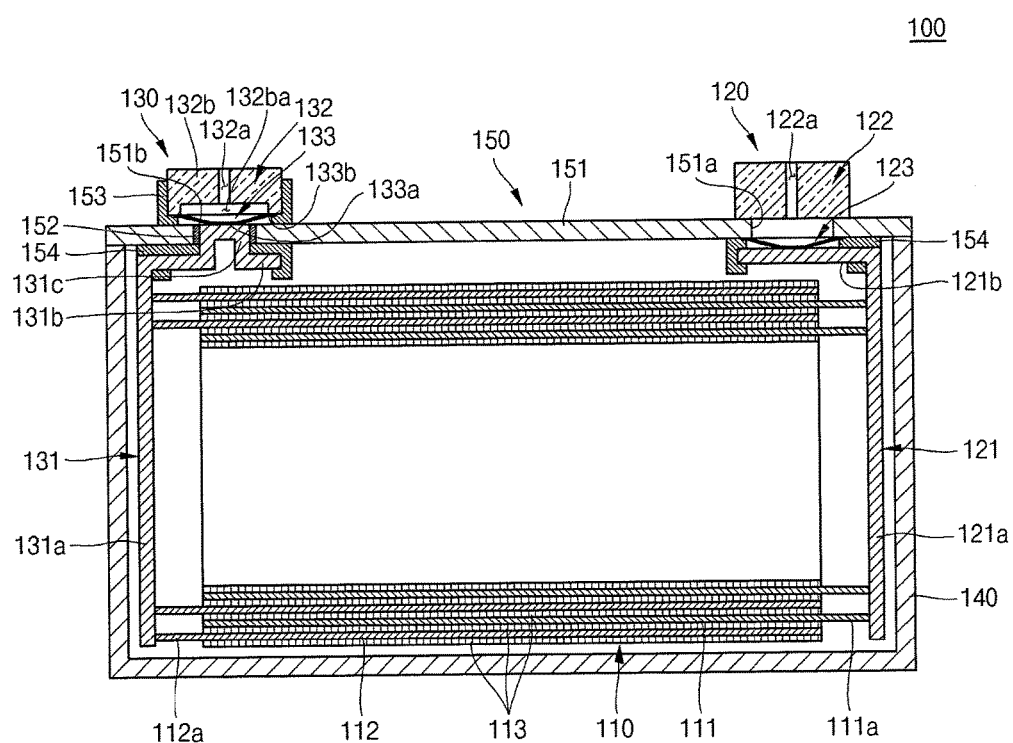
FIG. 1B illustrates a cross-sectional view taken along the line I-I' of FIG. 1A.
Figure 1C:
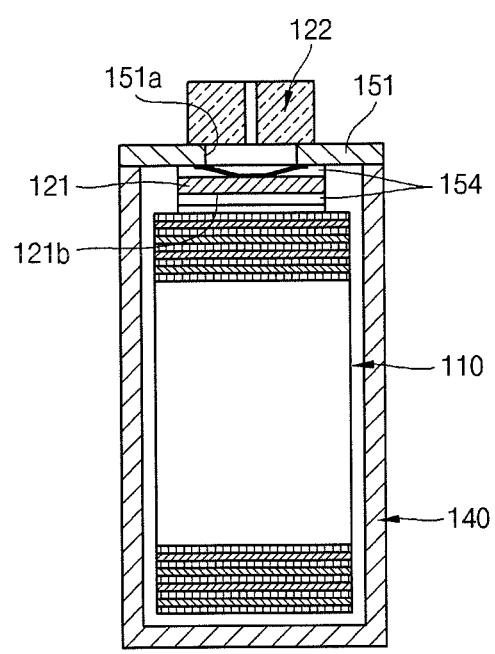
FIG. 1C illustrates a cross-sectional view taken along the line J-J' of FIG. 1A.

FIG. 1A illustrates a perspective view of a rechargeable battery according to an embodiment, FIG. 1B illustrates a cross-sectional view taken along the line I-I' of FIG. 1A, and FIG. 1C illustrates a cross-sectional view taken along the line J-J' of FIG. 1A.

As shown in FIGS. 1A and 1B, the rechargeable battery 100 according to an embodiment may include an electrode assembly 110, a first terminal 120, a second terminal 130, a case 140, and a cap assembly 150.

The electrode assembly 110 may be formed by winding or laminating a stacked structure having a first electrode plate 111, a separator 113, and a second electrode plate 112, which are formed of a thin plate or layer. In an implementation, the first electrode plate 111 may function as a positive electrode and the second electrode plate 112 may function as a negative electrode, or vice versa.

The first electrode plate 111 may be formed by applying a first electrode active material, e.g., a transition metal oxide, on a first electrode collector plate formed of metal foil, e.g., aluminum. The first electrode plate 111 may include a first electrode uncoated portion 111a on which the first electrode active metal is not applied. The first electrode uncoated portion 111a may function as a passage for current flowing between the first electrode plate 111 and an outside of the first electrode plate 111.

The second electrode plate 112 may be formed by applying a second electrode active material, e.g., graphite or carbon, on a second electrode collector plate formed of a metal foil, e.g., nickel or copper foil. The second electrode plate 112 may include a second electrode uncoated portion 112a on which the second electrode active metal is not applied. The second electrode uncoated portion 112a may function as a passage for current flowing between the second electrode plate 112 and an outside of the second electrode plate 112.

The separator 113 may be between the first electrode plate 111 and the second electrode plate 112 to help prevent short circuiting and to facilitate the movement of lithium ions. In an implementation, the separator 113 may be formed of, e.g., polyethylene, polypropylene, or a composite film of polypropylene and polyethylene.

A first terminal 120 and a second terminal 130 (electrically connected to the first electrode plate 111 and the second electrode plate 112, respectively) may be coupled with ends of the electrode assembly 110.

The electrode assembly 110 and electrolyte may be accommodated within the case 140. In an implementation, the electrolyte may include an organic solvent, e.g., ethylene carbonate (EC), propylene carbonate (PC), diethyl carbonate (DEC), ethyl methyl carbonate (EMC), or dimethyl carbonate (DMC), and a lithium salt, e.g., $LiPF_6$ or $LiBF_4$. The electrolyte may be, e.g., a liquid, a solid, or a gel.

The first terminal 120 may be formed of a metal or an equivalent thereof, and may be electrically connected to the first electrode plate 111. The first terminal 120 may include a first collector plate 121, a first electrode terminal 122, and a first connection plate 123.

The first collector plate 121 may contact the first electrode uncoated portion 111a protruding at an end of the electrode assembly 110. The first collector plate 121 may be welded to the first electrode uncoated portion 111a. In an implementation, the first collector plate 121 may be formed of, e.g., aluminum, an aluminum alloy, or the like.

The first collector plate 121 may have an approximately 'L' shape, and may include a first region 121a and a second region 121b. The first region 121a may be welded to the first electrode uncoated portion 111a of the electrode assembly 110 and may be vertically upright, e.g., may extend parallel with side walls of the battery 100. The second region 121b may be bent from a top end of the first region 121a at an approximately right angle and may extend a predetermined length, so that it may be positioned in parallel with a cap plate 151 (to be described below) in a substantially horizontally reclining position. A top surface of the second region 121b may be electrically connected to the first connection plate 123. For example, the first terminal 120 may have the same polarity as the cap plate 151.

The first electrode terminal 122 may be electrically connected to the cap plate 151, which will be described below. The first electrode terminal 122 may have a hollow or ring-shaped horizontal section due to a first terminal hole 122a passing through the first electrode terminal 122 from a top surface and a bottom surface of the first electrode terminal 122. While FIG. 1A shows that the first electrode terminal 122 has a rectangular horizontal section, in an implementation, the first electrode terminal 122 may have, e.g., a circular, polygonal, or other shaped horizontal section. The bottom surface of the first electrode terminal 122 may be welded to a top surface of the cap plate 151 to entirely cover a first electrode hole 151a in the cap plate 151.

The first electrode terminal 122 may be formed of a suitable material, e.g., aluminum, an aluminum alloy, or the like.

Figure 2:
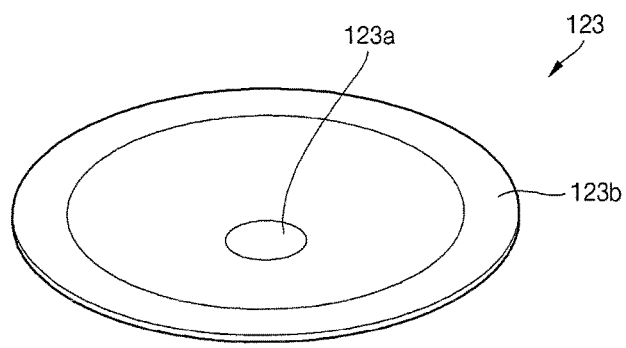
FIG. 2 illustrates a perspective view of a state in which a connection plate shown in FIG. 1B operates as a fuse.

As shown in FIG. 2, the first connection plate 123 may have a circular horizontal section and may be of a downwardly convex dish shape. The first connection plate 123 will now be described with reference to FIGS. 1A, 1B, and 2. The first connection plate 123 may be electrically connected to the cap plate 151 and the first collector plate 121. For example, the first connection plate 123 may have a downwardly convex central bulge 123a (electrically connected to the first collector plate 121) and an edge portion 123b (electrically connected to the cap plate 151).

The edge portion 123b may be welded to the bottom surface of the cap plate 151. For example, the edge portion 123b may be welded to an outer peripheral edge of the first electrode hole 151a in the cap plate 151. In an implementation, the first connection plate 123 may close the first electrode hole 151a that passes through the cap plate 151 from the top surface to the bottom surface of the cap plate 151 while the edge portion 123b is welded to the cap plate 151.

The first connection plate 123 may be elastic and may have the downwardly convex central bulge 123 inverted to be upwardly convex in response to a predetermined pressure applied thereto. For example, the first connection plate 123 may be inverted and broken. In an implementation, in the first connection plate 123 having the edge portion 123b fixed, e.g., welded, to the cap plate 151, the central bulge 123a contacting the first collector plate 121 may be inverted to be electrically disconnected from the first collector plate 121 to then be broken when the internal pressure of the rechargeable battery 100 exceeds the predetermined or reference pressure for determining whether the rechargeable battery 100 is over-charged. If the first connection plate 123 is broken in the above-described manner, internal gases of the case 140 may be discharged to the outside of the case 140 through the first electrode hole 151a of the cap plate 151 and the first terminal hole 122a of the first electrode terminal 122.

In addition, the first connection plate 123 may be a thin film plate having a smaller thickness than the first collector plate 121 or the first electrode terminal 122. The first connection plate 123 may function as a fuse that is melted or broken when an over-current is applied if an external short circuit or an event, e.g., nail penetration, occurs.

The first connection plate 123 may be formed of, e.g., aluminum. In an implementation, the first connection plate 123 may be formed of a thin film made of, e.g., nickel, iron, copper, or a combination thereof, which may be melted during an over-current.

The second terminal 130 may also be formed of a metal or the like and may be electrically connected to the second electrode plate 112. The second terminal 130 may include a second collector plate 131, a second electrode terminal 132, and a second connection plate 133.

The second collector plate 131 may contact the second electrode uncoated portion 112a protruding at one end of the electrode assembly 110. The second collector plate 131 may be welded to the second electrode uncoated portion 112a. The second collector plate 131 may be formed of, e.g., aluminum, an aluminum alloy, or the like.

The second collector plate 131 may have an approximately 'L' shape, and may include a first region 131a and a second region 131b. The first region 131a may be welded to the second electrode uncoated portion 112a of the electrode assembly 110 and may be vertically upright, e.g., may extend parallel with sides of the battery 100. The second region 131b may be bent from a top end of the first region 131a at an approximately right angle and may extend a predetermined length, so that it is positioned in parallel with the cap plate 151 in a substantially horizontally lying position. An upwardly protruding collector plate protrusion 131c may be formed in the second region 131b of the second collector plate 131.

The collector plate protrusion 131c may be formed by bending the second region 131b. The collector plate protrusion 131c may be electrically connected to the second connection plate 133 while passing through a second electrode hole 151b in the cap plate 151. A top surface of the collector plate protrusion 131c may be coplanar with the top surface of the cap plate 151.

The second electrode terminal 132 may be electrically connected to the second connection plate 133. The second electrode terminal 132 may be welded to an edge portion 133b of the second connection plate 133. The second electrode terminal 132 may be a ring-shaped horizontal section due to a second terminal hole 132a passing through the second electrode terminal 132 from a top surface and a bottom surface of the second electrode terminal 132. The second electrode terminal 132 may have a second terminal protrusion 132b horizontally protruding to a top portion of the second terminal hole 132a. For example, the second terminal hole 132a may have a stepped portion due to the second terminal protrusion 132b, so that its top surface perimeter may be smaller than its bottom surface perimeter. In an implementation, the top surface perimeter of the second terminal hole 132a may be the same as a perimeter of the horizontal section of the first terminal hole 122a of the first electrode terminal 122. In addition, in order to facilitate welding between the bottom surface perimeter of the second terminal hole 132a and an edge portion 133b of the second connection plate 133, the bottom surface perimeter of the second terminal hole 132a may be smaller than the perimeter of the edge portion 133b of the second connection plate 133. In the second terminal hole 132a, a bottom portion (132ba) of the second terminal protrusion 132b may be a space in which the second connection plate 133 is inverted.

The second electrode terminal 132 may be electrically disconnected or insulated from the cap plate 151 by an upper insulation member 154 of the cap plate 151.

The second electrode terminal 132 may be formed of a suitable material, e.g., copper, a copper alloy, or the like.

The second connection plate 133 may have a downwardly convex dish shape, which may be the same as that of the first connection plate 123 shown in FIG. 2. The second connection plate 133 may be electrically connected to the second electrode terminal 132 and the second collector plate 131, e.g., during normal operation of the battery 100. For example, the second connection plate 133 may have a central bulge 133a (electrically connected to the second collector plate 131) and an edge portion 133b (electrically connected to the second electrode terminal 132).

The edge portion 133b may be welded to a bottom surface of the second electrode terminal 132. For example, the edge portion 133b may be welded to an outer peripheral edge of the second terminal hole 132b of the bottom surface of the second electrode terminal 132. In an implementation, the second connection plate 133 may close the second terminal hole 132b passing through the second electrode terminal 132 from the top surface to the bottom surface of the second electrode terminal 132 while the edge portion 133b is welded to the second electrode terminal 132.

The second connection plate 133 may be elastic and may have a downwardly convex central bulge 133a inverted to be upwardly convex in response to a predetermined pressure applied thereto. For example, the second connection plate 133 may be inverted and broken. In an implementation, in the second connection plate 133 having the edge portion 133b fixed, e.g., welded, to the second electrode terminal 132, the central bulge 133a contacting the second collector plate 131 may be inverted to be electrically disconnected from the second collector plate 131 to then be broken when the internal pressure of the rechargeable battery 100 exceeds the predetermined or reference pressure, The second connection plate 133 may be a thin film plate having a smaller thickness than the second collector plate 131 or the second electrode terminal 132. The second connection plate 133 may function as a fuse that is melted or broken when an over-current is applied if an external short circuit or an event, e.g., nail penetration, Occurs.

The second connection plate 133 may be formed of, e.g., copper. In an implementation, the second connection plate 133 may be formed of a thin film made of, e.g., nickel, iron, aluminum, or a combination thereof, which may be melted during an over-current.

The case 140 may be formed of a conductive metal, e.g., aluminum, an aluminum alloy or a nickel plated steel and may have an approximately hexahedral shape provided with an opening through which the electrode assembly 110, the first collector plate 121 of the first terminal 120 and the second collector plate 131 of the second terminal 130 are inserted and placed. The case 140 and the cap assembly 150 are illustrated in an assembled state in FIG. 1B, and the opening of the case 140 is not shown. However, it is to be understood that the opening corresponds to a substantially opened portion of an edge of the cap assembly 150. An inner surface of the case 140 may be treated to be insulated from the electrode assembly 110 and the first and second terminals 120 and 130.

The cap assembly 150 may be coupled with the case 140. For example, the cap assembly 150 may include the cap plate 151, a side insulation member 152, an upper insulation member 153, and a lower insulation member 154.

The side insulation member 152, the upper insulation member 153, and the lower insulation member 154 may be regarded as components of the first terminal 120 and the second terminal 130.

The cap plate 151 may close or seal the opening of the case 140 and may be formed of a same material as that of the case 140. The cap plate 151 may be coupled with the case 140 by, e.g., laser welding. The cap plate 151 may be welded to the first electrode terminal 122 of the first terminal 120 and may have the same polarity as the first terminal 120. Accordingly, the cap plate 151 and the case 140 may have the same polarity.

The side insulation member 152 may be made of an insulating material and may surround the second collector plate 131 passing through the cap plate 151. For example, the side insulation member 152 may be interposed between the second collector plate 131 and the cap plate 151 to electrically disconnect or insulate the second collector plate 131 from the cap plate 151.

The upper insulation member 153 may be interposed between the second electrode terminal 132 and the cap plate 151. In addition, the upper insulation member 153 may tightly contact the cap plate 151 and the second electrode terminal 132. In addition, the upper insulation member 153 may also be formed on lateral surfaces of the second electrode terminal 132. The upper insulation member 153 may electrically insulate the second electrode terminal 132 from the cap plate 151. In addition, the upper insulation member 153 may also electrically insulate from the cap plate 151 the second connection plate 133 having the edge portion 133b welded to the bottom surface of the second electrode terminal 132. For example, the upper insulation member 153 may be on the outer peripheral edge of the second connection plate 133 and may electrically disconnect or insulate the second electrode terminal 132 from the cap plate 151.

The lower insulation member 154 may be between each of the first collector plate 121 and the second collector plate 131 and the cap plate 151, thereby preventing unnecessary and undesirable short circuits. The lower insulation member 154 may be between each of the second region 121b of the first collector plate 121 and the second region 131b of the second collector plate 131 and the cap plate 151. The lower insulation member 154 may be formed at an end of the second region 121b of the first collector plate 121 and at the second region 121b bent from the first region 121a. In addition, the lower insulation member 154 may be formed at an end of the second region 131b of the second collector plate 131 and at the second region 131b bent from the first region 131a.

For example, the lower insulation member 154, formed between the second region 121b of the first collector plate 121 and a portion of the second region 131b of the second collector plate 131, may help reduce the likelihood and/or prevent short circuits between the first collector plate 121 and the cap plate 151 and may transmit the internal pressure of the case 140 to the first and second connection plates 123 and 133.

In the rechargeable battery 100 according to the present embodiment, the dish-shaped first connection plate 123 and the dish-shaped second connection plate 133 may be provided in the first terminal 120 and the second terminal 130, respectively. The dish-shaped first connection plate 123 and the dish-shaped second connection plate 133 may be inverted and broken when the internal pressure of the rechargeable battery 100 exceeds the predetermined or reference pressure due to, e.g., over-charge, thereby securing electrical safety.

In addition, in the rechargeable battery 100 according to the present embodiment, the dish-shaped first connection plate 123 and the dish-shaped second connection plate 133 may be provided in the first terminal 120 and the second terminal 130, respectively. The dish-shaped first connection plate 123 and the dish-shaped second connection plate 133 may be capable of functioning as fuses that melted and broken when an event occurs or an over-current flows, suggesting that it is not necessary to provide a separate over-current preventing fuse, thereby increasing durability of the rechargeable battery 100 and reducing the number of components and the overall weight of the rechargeable battery 100.

Figure 3:
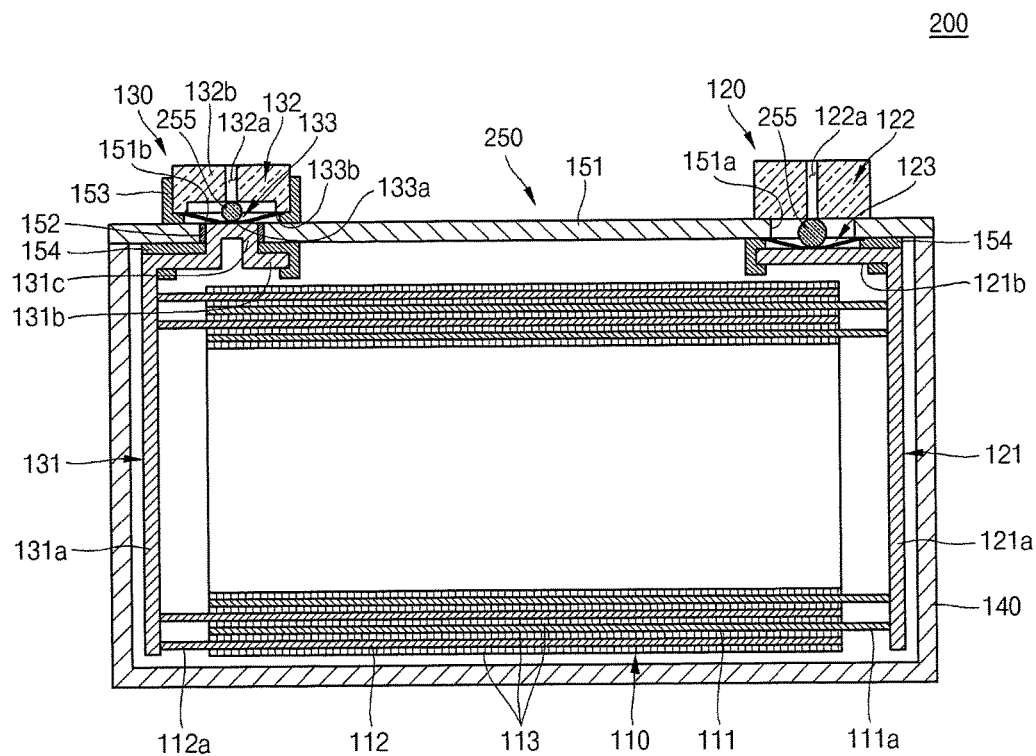
FIG. 3 illustrates a cross-sectional view of a rechargeable battery according to another embodiment.

Referring to FIG. 3, a cross-sectional view of a rechargeable battery according to another embodiment is illustrated.

As shown in FIG. 3, the rechargeable battery 200 according to the present embodiment is substantially the same as the rechargeable battery 100 shown in FIGS. 1A and 1B, in view of configurations of an electrode assembly 110, a first terminal 120, a second terminal 130, and a case 140. A perspective view of the rechargeable battery 200 according to the present embodiment is also the same as FIG. 1A. Therefore, in the following description, the rechargeable battery 200 will be described with regard to a cap assembly 250, which is different from the cap assembly 150 of the rechargeable battery 100 shown in FIGS. 1A and 1B.

The cap assembly 250 of the rechargeable battery 200 may include a cap plate 151, a side insulation member 152, an upper insulation member 153, a lower insulation member 154, and an elastic supporting member 255. Here, the cap plate 151, the side insulation member 152, the upper insulation member 153 and the lower insulation member 154 are the same as the corresponding components of the rechargeable battery 100, and the following description will focus on the elastic supporting member 255.

The elastic supporting member 255 may have an elastic ball shape. The elastic supporting member 255 may be interposed between the first electrode terminal 122 and the first connection plate 123 and may help reduce the likelihood of and/or prevent inversion of the first connection plate 123. In addition, the elastic supporting member 255 may be interposed between the second electrode terminal 132 and the second connection plate 133 and may help reduce the likelihood of and/or prevent inversion of the second connection plate 133. In an implementation, the elastic supporting member 255 may be made of, e.g., heat resistant silicon.

In order to reduce the likelihood of and/or prevent the first connection plate 123 and the second connection plate 133 from being inverted at a pressure lower than the predetermined or reference pressure, the elastic supporting member 255 may be positioned on the central bulge 123a of the first connection plate 123 and/or on the central bulge 133a of the second connection plate 133. For example, the elastic supporting member 255 may help reduce the likelihood of and/or prevent the first connection plate 123 and the second connection plate 133, which may be formed of thin films, from being inverted at a pressure below the predetermined or reference pressure.

When an internal pressure of the case 140 exceeding the predetermined or reference pressure is applied to the first connection plate 123 and the second connection plate 133, the elastic supporting member 255 may be compressed by the pressure applied through the first connection plate 123 and the second connection plate 133. At this time, the first connection plate 123 and the second connection plate 133 may be inverted and broken.

The rechargeable battery 200 may have improved safety by reducing the likelihood of and/or preventing the first connection plate 123 and the second connection plate 133, which are formed of thin films, from being inverted at a pressure that is lower than the predetermined or reference pressure.

For example, like the rechargeable battery 100 shown in FIGS. 1A and 1B, the rechargeable battery 200 according to the present embodiment may increase the safety against occurrence of over-current, over-charge, or an event and durability of battery. The safety of the rechargeable battery 200 may be further improved by preventing the first connection plate 123 and the second connection plate 133 from being inverted at an internal pressure that is lower than the predetermined or reference pressure.

Figure 4:
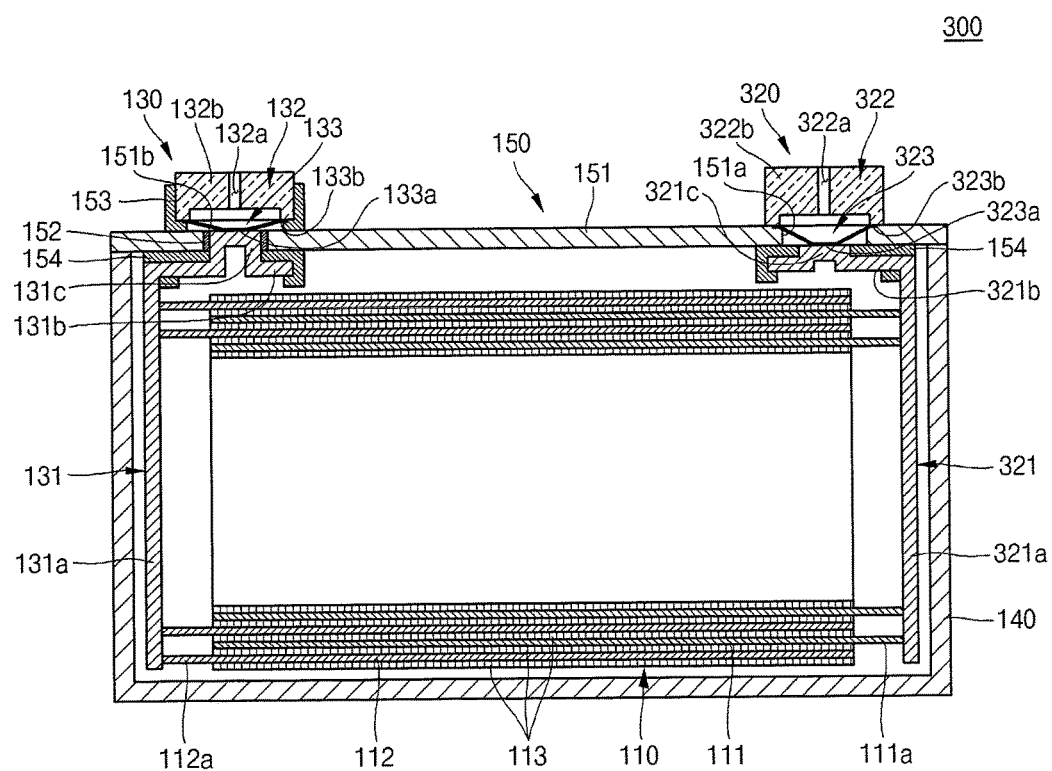
FIG. 4 illustrates a cross-sectional view of a rechargeable battery according to another embodiment.

Referring to FIG. 4, a cross-sectional view of a rechargeable battery according to another embodiment is illustrated.

As shown in FIG. 4, the rechargeable battery 300 according to the present embodiment is substantially the same as the rechargeable battery 100 shown in FIGS. 1A and 1B, in view of configurations of an electrode assembly 110, a second terminal 130, a case 140, and a cap assembly 150. A perspective view of the rechargeable battery 300 according to the present embodiment is also the same as FIG. 1A. Therefore, in the following description, the rechargeable battery 300 will be described with regard to a first terminal 320, which is different from the first terminal 120 of the rechargeable battery 100 shown in FIGS. 1A and 1B.

The first terminal 320 may be generally formed of a metal or the like, and may be electrically connected to a first electrode plate 111. The first terminal 320 may include a first collector plate 321, a first electrode terminal 323, and a first connection plate 322.

The first collector plate 321 may contact a first electrode uncoated portion 111a protruding at an end of the electrode assembly 110. The first collector plate 321 may be welded to the first electrode uncoated portion 111a. The first collector plate 321 may be formed of, e.g., aluminum, an aluminum alloy, or the like.

The first collector plate 321 may have an approximately 'L' shape, and may include a first region 321a and a second region 321b. The first region 321a may be welded to the first electrode uncoated portion 111a of the electrode assembly 110 and may be vertically upright, e.g., may extend parallel with sides of the battery 100. The second region 321b may be bent from a top end of the first region 321a at an approximately right angle and may extend a predetermined length, so that it is positioned in parallel with the cap plate 151 in a substantially horizontally reclining position. An upwardly protruding first collector plate protrusion 321c may be formed in the second region 321b of the first collector plate 321.

The collector plate protrusion 321c may be formed by bending the second region 321b. The collector plate protrusion 321c may be coplanar with a bottom surface of the cap plate 151. For example, the collector plate protrusion 321c may be electrically connected to the first connection plate 323 such that it upwardly protrudes to be upwardly exposed through a lower insulation member 154 of the cap assembly 150.

The first electrode terminal 322 may be electrically connected to the cap plate 151. The first electrode terminal 322 may have a ring-shaped horizontal section due to a first terminal hole 322a passing through the first electrode terminal 322 from a top surface and a bottom surface of the first electrode terminal 322. A bottom surface of the first electrode terminal 322 may be welded to a top surface of the cap plate 151 to entirely cover the first electrode hole 151a formed in the cap plate 151.

The first electrode terminal 322 may have a first terminal protrusion 322b horizontally protruding to a top portion of the first terminal hole 322a. For example, the first terminal hole 322a may have a stepped portion due to the first terminal protrusion 322b, so that its top surface perimeter is smaller than its bottom surface perimeter. The first electrode terminal 322 may be welded to the first connection plate 323 such that an edge portion 323b of the first connection plate 323 is welded to the bottom surface of the first terminal hole 322a. In an implementation, the bottom surface perimeter of the first terminal hole 322a may be smaller than the edge portion 323b of the first connection plate 323. In an implementation, the bottom surface perimeter of the first terminal hole 322a may be the same as a perimeter of the first electrode hole 151a. In the first terminal hole 322a, a bottom portion of the first terminal protrusion 322b may be a space in which the first connection plate 323 is inverted.

The first electrode terminal 322 may be formed of a suitable material, e.g., aluminum, an aluminum alloy, or the like.

The first connection plate 323 may have a circular horizontal section and may have a downwardly convex dish shape, which may be the same as that of the first connection plate 123 shown in FIG. 2. The first connection plate 323 may be electrically connected to the first electrode terminal 322, the cap plate 151, and the first collector plate 321. For example, the first connection plate 323 may have a downwardly convex central bulge 323a (electrically connected to the first collector plate 321) and an edge portion 323b (electrically connected to the first electrode terminal 322 and the cap plate 151).

The edge portion 323b may be interposed and welded between the first electrode terminal 322 and the cap plate 151. In an implementation, the edge portion 323b may be welded to a top surface of the outer peripheral edge of the first electrode hole 151a formed in the cap plate 151. The first connection plate 323 may close the first electrode hole 151a (passing through the cap plate 151 from the top surface to the bottom surface of the cap plate 151) while the edge portion 323b is welded to the cap plate 151 and the first electrode terminal 322.

The first connection plate 323 may be elastic and may have the downwardly convex central bulge 323a that is configured to invert to be upwardly convex in response to a predetermined or reference pressure applied thereto. For example, the first connection plate 323 may be inverted and broken. In an implementation, in the first connection plate 323 having the edge portion 323b fixed or welded to the cap plate 151 and the first electrode terminal 322, the central bulge 323a contacting the first collector plate 321 may be inverted to be electrically disconnected from the first collector plate 321 to then be broken when the internal pressure of the rechargeable battery 300 exceeds a predetermined or reference pressure for determining whether the rechargeable battery 300 is over-charged. If the first connection plate 323 is broken in the above-described manner, internal gases of the case 140 may be discharged to the outside of the case 140 through the first electrode hole 151a of the cap plate 151 and the first terminal hole 322a of the first electrode terminal 322.

In addition, the first connection plate 323 may be a thin film plate having a smaller thickness than the first collector plate 321 or the first electrode terminal 322. The first connection plate 323 may function as a fuse that is melted or broken when an over-current is applied if an external short circuit or an event, e.g., nail penetration, occurs.

In an implementation, the first connection plate 323 may be formed of a thin film made of, e.g., aluminum, nickel, copper, iron, or a combination thereof.

In addition, the first terminal 320 may be interposed between the first electrode terminal 322 and the first connection plate 323 and may further include an elastic supporting member (not shown) for preventing the first connection plate 323 from being inverted at an internal pressure that is below the predetermined or reference pressure, like the rechargeable battery 200 shown in FIG. 3.

Figure 5:
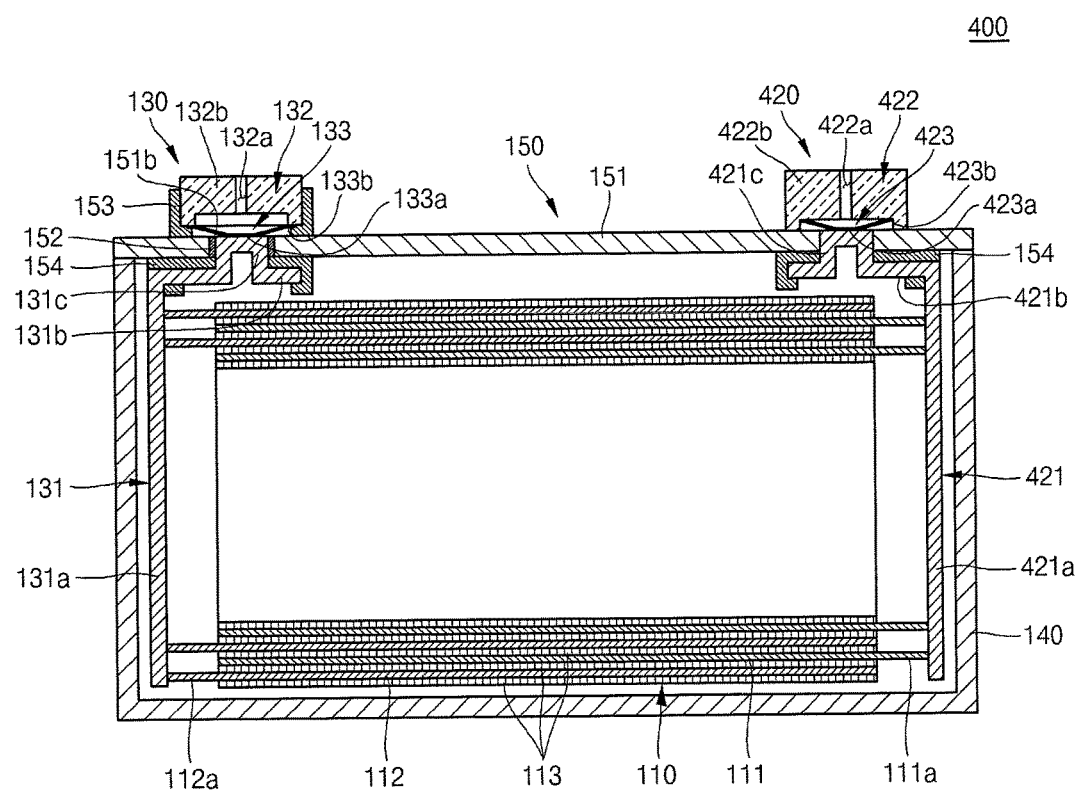
FIG. 5 illustrates a cross-sectional view of a rechargeable battery according to another embodiment.

Referring to FIG. 5, a cross-sectional view of a rechargeable battery according to another embodiment is illustrated.

As shown in FIG. 5, the rechargeable battery 400 according to the present embodiment is substantially the same as the rechargeable battery 100 shown in FIGS. 1A and 1B, in view of configurations of an electrode assembly 110, a second terminal 130, a case 140, and a cap assembly 150. A perspective view of the rechargeable battery 400 according to the present embodiment is also the same as FIG. 1A. Therefore, in the following description, the rechargeable battery 400 will be described with regard to a first terminal 420, which is different from the first terminal 120 of the rechargeable battery 100 shown in FIGS. 1A and 1B.

The first terminal 420 may be generally formed of a metal or the like, and may be electrically connected to a first electrode plate 111. The first terminal 420 may include a first collector plate 421, a first electrode terminal 423, and a first connection plate 422.

The first collector plate 421 may contact a first electrode uncoated portion 111a protruding at an end of the electrode assembly 110. The first collector plate 421 may be welded to the first electrode uncoated portion 111a. The first collector plate 421 may be formed of, e.g., aluminum, an aluminum alloy, or the like.

The first collector plate 421 may have an approximately 'L' shape, and may include a first region 421a and a second region 421b. The first region 421a may be welded to the first electrode uncoated portion 111a of the electrode assembly 110 and may be vertically upright, e.g., may extend parallel with sides of the battery 400. The second region 421b may be bent from a top end of the first region 421a at an approximately right angle and may extend a predetermined length, so that it is positioned in parallel with a cap plate 151 in a substantially horizontally reclining position. An upwardly protruding first collector plate protrusion 421c may be formed in the second region 421b of the first collector plate 421.

The collector plate protrusion 421c may be formed by bending the second region 421b. The collector plate protrusion 421c may be electrically connected to the second connection plate 323 while passing through a first electrode hole 151a formed in the cap plate 151. In addition, the collector plate protrusion 421c may be received in and may contact the first electrode hole 151a of the cap plate 151 to be electrically connected to the cap plate 151. For example, the first collector plate 121 may be electrically connected to the cap plate 151 and the first connection plate 123 and may have the same polarity as the cap plate 151 and the first connection plate 123.

The first electrode terminal 422 may be electrically connected to the cap plate 151. The first electrode terminal 422 may have a ring-shaped horizontal section due to a first terminal hole 422a passing through the first electrode terminal 422 from a top surface and a bottom surface of the first electrode terminal 422. A bottom surface of the first electrode terminal 422 may be welded to a top surface of the cap plate 151 to entirely cover the first electrode hole 151a formed in the cap plate 151.

The first electrode terminal 422 may have a first terminal protrusion 422b horizontally protruding to a top portion of the first terminal hole 422a. For example, the first terminal hole 422a may have a stepped portion due to the first terminal protrusion 422b, so that its top surface perimeter may be smaller than its bottom surface perimeter. The first electrode terminal 422 may be welded to the first connection plate 423 such that an edge portion 423b of the first connection plate 423 is welded to the bottom surface of the first terminal protrusion 422b. For example, the first terminal hole 422a of the first electrode terminal 422 may receive the first connection plate 423, and a top surface of the edge portion 423b of the first connection plate 423 may be welded to the bottom surface of the first terminal protrusion 422b. In order to allow the first terminal hole 422a of the first electrode terminal 422 to receive the first connection plate 423, the bottom surface perimeter of the first terminal hole 422a of the first electrode terminal 422 may be greater than the edge portion 423b of the first connection plate 423. In the first terminal hole 422a, a bottom portion of the first terminal protrusion 422b may be a space in which the first connection plate 423 is received.

In an implementation, the first electrode terminal 422 may be formed of a suitable material, e.g., aluminum, an aluminum alloy, or the like.

The first connection plate 423 may have a circular horizontal section and may have a downwardly convex dish shape, which may be the same as that of the first connection plate 123 shown in FIG. 2. The first connection plate 423 may be electrically connected to the first electrode terminal 422 and the first collector plate 421. For example, the first connection plate 423 may have a downwardly convex central bulge 423a electrically connected to the first collector plate 421 and an edge portion 423b electrically connected to the first terminal hole 422a of the first electrode terminal 422 and the cap plate 151.

The first connection plate 423 may be received in the first terminal hole 422a of the first electrode terminal 422. The edge portion 423b may be welded to a bottom surface of the first terminal protrusion 422b of the first terminal hole 422a. The first connection plate 423 may close the first terminal hole 422a (passing through the first electrode terminal 422 from the top surface to the bottom surface of the first electrode terminal 422) while the edge portion 423b is welded to the first electrode terminal 422.

The first connection plate 423 may be elastic and may have the downwardly convex central bulge 423a that is configured to invert to be upwardly convex in response to a pressure (that exceeds the predetermined or reference pressure) applied thereto. Here, the first connection plate 423 may be inverted and broken. For example, in the first connection plate 423 having the edge portion 423b fixed, e.g., welded, to the first electrode terminal 422, the central bulge 423a contacting the first collector plate 421 may be inverted to be electrically disconnected from the first collector plate 421 to then be broken when the internal pressure of the rechargeable battery 400 exceeds the predetermined or reference pressure (for determining whether the rechargeable battery 400 is over-charged). If the first connection plate 423 is broken in the above-described manner, internal gases of the case 140 may be discharged to the outside of the case 140 through the first electrode hole 151a of the cap plate 151 and the first terminal hole 422a of the first electrode terminal 422.

In addition, the first connection plate 423 may be a thin film plate having a smaller thickness than the first collector plate 421 or the first electrode terminal 422. The first connection plate 423 may function as a fuse that is melted or broken when an over-current is applied if an external short circuit or an event, e.g., nail penetration, occurs.

In an implementation, the first connection plate 423 may be formed of a thin film made of, e.g., aluminum, nickel, copper, iron, or a combination thereof.

In addition, the first terminal 420 may be interposed between the first electrode terminal 422 and the first connection plate 423 and may further include an elastic supporting member (not shown) for preventing the first connection plate 423 from being inverted at a pressure lower than the predetermined or reference pressure, like the rechargeable battery 200 shown in FIG. 3.

By way of summation and review, secondary batteries may be manufactured in various shapes, including cylindrical and prismatic shapes. Each of the unit batteries may include an electrode assembly (having a positive electrode, a negative electrode, and a separator between the positive and negative electrodes), a case (for housing the electrode assembly together with an electrolyte), and a cap assembly (for sealing the case). Positive and negative terminals may be connected to the electrode assembly, respectively, and may extend to an exterior of the case or battery through the cap assembly from the positive and negative electrodes.

The embodiments provide a rechargeable battery, which includes a dish-type or shaped connection plate at each terminal that is capable of functioning as a fuse, thereby securing or enhancing electrical safety such that the dish-shaped connection plate is configured to be inverted and/or broken when the internal pressure of the battery exceeds a reference or predetermined pressure.

The embodiments provide a rechargeable battery, which includes a dish-shaped connection plate provided at each terminal that is capable of functioning as a fuse, thereby increasing durability and reducing a number of components and an overall weight of the rechargeable battery by obviating the need for a separate over-current preventing fuse, such that the connection plate as the fuse is melted and broken when an event occurs or an over-current flows.

In the rechargeable battery according to an embodiment, a dish-shaped connection plate may be provided at each terminal, and when the internal pressure of battery exceeds a predetermined pressure due to over-charge, the connection plate may be inverted and broken, thereby securing electric safety of the rechargeable battery.

In addition, in the rechargeable battery according to an embodiment, a dish-shaped connection plate capable of functioning as a fuse may be provided at each terminal, and the need for a separate fuse is obviated such that when an event occurs or an over-current flows, the connection plate may be inverted and broken, thereby increasing durability of battery and reducing the number of components and the overall weight of the rechargeable battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A rechargeable battery, comprising:
an electrode assembly, the electrode assembly including a first electrode plate, a second electrode plate, and a separator;

a first terminal electrically connected to the first electrode plate;

a second terminal electrically connected to the second electrode plate;

a case accommodating the electrode assembly and portions of the first terminal and second terminal;

a cap assembly sealing the case, the cap assembly being electrically connected to the first terminal, the first terminal including:
- a first collector plate electrically connected to the first electrode plate and having a region adjacent to the cap assembly, and
- a first electrode terminal on the cap assembly and electrically connected to the cap assembly; and dish-shaped first and second connection plates on the first terminal and the second terminal, respectively, the first and second connection plates being invertable and breakable in response to a predetermined pressure respectively applied to the first and second connection plates, wherein:

the first electrode terminal includes a first terminal hole passing therethrough from a top surface to a bottom surface of the first electrode terminal such that the first electrode terminal has a ring-shaped horizontal section, a gas vent formed by the first connection plate and the first terminal hole passage is opened when the connection plate is in a broken state, the first terminal further includes a first elastic supporting member at least partially within a concavity of the first connection plate such that the first elastic supporting member is between a top portion of a central bulge of the first connection plate and the first electrode terminal, the first connection plate is between a portion of the cap assembly and the region of the first collector plate adjacent to the cap assembly and electrically connects the cap assembly to the first collector plate, and the first connection plate has a downwardly convex dish shape in which the central bulge thereof is electrically connected to the first collector plate and an edge portion thereof is electrically connected to the cap assembly.

2. The rechargeable battery as claimed in claim 1, wherein:
an edge portion of the first connection plate is welded to the cap assembly, and
a portion of the cap assembly welded to the edge portion is an outer peripheral edge of a first electrode hole in the cap assembly.

3. The rechargeable battery as claimed in claim 1, wherein the second terminal further includes:
- a second collector plate electrically connected to the second electrode plate and having a collector plate protrusion adjacent to a top portion of the cap assembly, and
- a second electrode terminal on the cap assembly and electrically insulated from the cap assembly, wherein the second connection plate is on the cap assembly and electrically connects the second collector plate to the second electrode terminal.

4. The rechargeable battery as claimed in claim 3, wherein the second connection plate has a downwardly convex dish shape in which a central bulge thereof is electrically connected to the second collector plate and an edge portion thereof is electrically connected to the second electrode terminal.

5. The rechargeable battery as claimed in claim 4, wherein the edge portion of the second connection plate is welded to the second electrode terminal.

6. The rechargeable battery as claimed in claim 4, wherein the second terminal further includes a second elastic supporting member between a top portion of the central bulge of the second connection plate and the second electrode terminal.

7. The rechargeable battery as claimed in claim 6, wherein the second electrode terminal further includes:
- a second terminal hole passing therethrough from a top surface to a bottom surface of the second electrode terminal such that the second electrode terminal has a ring-shaped horizontal section, and
- a second terminal protrusion horizontally protruding to a top portion of the second terminal hole.

8. The rechargeable battery as claimed in claim 3, wherein the second electrode terminal includes a second terminal hole passing therethrough from a top surface to a bottom surface of the second electrode terminal such that the second electrode terminal has a ring-shaped horizontal section.

9. The rechargeable battery as claimed in claim 1, wherein:
the first terminal further includes a collector plate protrusion adjacent to a top portion of the cap assembly, and
an edge portion of the first connection plate is electrically connected to the first electrode terminal.

10. The rechargeable battery as claimed in claim 9, wherein:
the edge portion of the first connection plate is interposed and welded between the cap assembly and the first electrode terminal, and
a portion of the cap assembly welded to the edge portion is an outer peripheral edge of a first electrode hole formed in the cap assembly.

11. The rechargeable battery as claimed in claim 10, wherein the central bulge of the first connection plate passes through the first electrode hole of the cap assembly and is electrically connected to the first collector plate.

12. The rechargeable battery as claimed in claim 1, wherein the first terminal further includes:
a collector plate protrusion adjacent to a top portion of the cap assembly, wherein the first connection plate is on the cap assembly and electrically connects the first electrode terminal to the collector plate protrusion.

13. The rechargeable battery as claimed in claim 12, wherein the first electrode terminal further includes a first terminal protrusion horizontally protruding to a top portion of the first terminal hole.

14. The rechargeable battery as claimed in claim 12, wherein the cap assembly includes a first electrode hole passing therethrough from a top surface to a bottom surface of the cap assembly, and the first collector plate is electrically connected to the first connection plate while passing through the first electrode hole.

* * * * *